(12) United States Patent
Murakami et al.

(10) Patent No.: US 10,397,462 B2
(45) Date of Patent: Aug. 27, 2019

(54) IMAGING CONTROL APPARATUS AND IMAGING APPARATUS FOR SYNCHRONOUS SHOOTING

(71) Applicant: CASIO COMPUTER CO., LTD., Shibuya-ku, Tokyo (JP)

(72) Inventors: Tomohiko Murakami, Musashino (JP); Tsuyoshi Horiguchi, Ome (JP); Hiroshi Suzuki, Akiruno (JP); Muneyuki Ishihara, Chofu (JP); Takehito Morimatsu, Fussa (JP); Ken Fujita, Mitaka (JP); Toshihiro Kiuchi, Hachioji (JP); Naoya Okamoto, Fussa (JP); Takuya Koiso, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 10 days.

(21) Appl. No.: 15/634,625

(22) Filed: Jun. 27, 2017

(65) Prior Publication Data
US 2018/0069990 A1 Mar. 8, 2018

(30) Foreign Application Priority Data

Sep. 5, 2016 (JP) .................................. 2016-172408

(51) Int. Cl.
*H04N 5/06* (2006.01)
*H04N 5/232* (2006.01)
*H04N 5/247* (2006.01)

(52) U.S. Cl.
CPC ... *H04N 5/232061* (2018.08); *H04N 5/23245* (2013.01); *H04N 5/247* (2013.01); *H04N 5/06* (2013.01)

(58) Field of Classification Search
CPC ......... H04N 5/23206; H04N 5/232061; H04N 5/23245; H04N 5/247
See application file for complete search history.

(56) References Cited

U.S. PATENT DOCUMENTS 9,253,389 B2   2/2016   Muraki et al.
9,451,218 B2   9/2016   Hanabusa
(Continued)

FOREIGN PATENT DOCUMENTS

JP   2005252955 A   9/2005
JP   2012168321 A   9/2012
(Continued)

OTHER PUBLICATIONS

Japanese Office Action (and English language translation thereof) dated Feb. 12, 2019 issued in counterpart Japanese Application No. 2016-172408.

*Primary Examiner* — Daniel M Pasiewicz
(74) *Attorney, Agent, or Firm* — Holtz, Holtz & Volek PC (57) ABSTRACT

An imaging control apparatus includes: a processor; and a radio communication unit capable of selecting a first transmission mode and a second transmission mode, the first transmission mode involving wireless data transmission to each of a plurality of imaging apparatuses with reception of a receipt acknowledgement from the imaging apparatuses, the second transmission mode involving simultaneous wireless data transmission to the imaging apparatuses without reception of the receipt acknowledgement from the imaging apparatuses. The processor performs a communication controlling step involving, in the case of instructing at least one simultaneous shooting process to the imaging apparatuses, separately transmitting each piece of shooting preparation instruction data instructing shooting preparation to each of the imaging apparatuses in the first transmission mode, and then simultaneously transmitting shooting instruction data to the imaging apparatuses in the second transmission mode.

12 Claims, 5 Drawing Sheets

(56) References Cited

U.S. PATENT DOCUMENTS

| | | | | |
|---|---|---|---|---|
| 9,998,648 | B2* | 6/2018 | Ito | G08C 17/02 |
| 2005/0151852 | A1* | 7/2005 | Jomppanen | H04N 5/0733 |
| | | | | 348/218.1 |
| 2007/0274705 | A1* | 11/2007 | Kashiwa | H04N 5/232 |
| | | | | 396/310 |
| 2011/0050925 | A1* | 3/2011 | Watanabe | H04N 5/232 |
| | | | | 348/211.2 |
| 2011/0205380 | A1* | 8/2011 | Shirakawa | H04N 5/232 |
| | | | | 348/211.9 |
| 2014/0002664 | A1* | 1/2014 | Hanabusa | H04N 7/181 |
| | | | | 348/159 |
| 2015/0103196 | A1* | 4/2015 | Shin | H04N 5/23203 |
| | | | | 348/211.1 |
| 2016/0182803 | A1* | 6/2016 | Song | H04N 1/00209 |
| | | | | 348/211.2 |
| 2017/0171452 | A1* | 6/2017 | Spielberg | H04N 5/23206 |
| 2017/0289427 | A1* | 10/2017 | Eum | H04N 5/23206 |
| 2017/0339299 | A1* | 11/2017 | Iki | H04N 1/00973 |

FOREIGN PATENT DOCUMENTS

| | | | |
|---|---|---|---|
| JP | 2014011529 | A | 1/2014 |
| JP | 2014011633 | A | 1/2014 |
| JP | 2015015559 | A | 1/2015 |

\* cited by examiner

IMAGING CONTROL APPARATUS AND IMAGING APPARATUS FOR SYNCHRONOUS SHOOTING

CROSS-REFERENCE TO RELATED APPLICATIONS

The present U.S. patent application claims a priority under the Paris Convention of Japanese Patent Application No. 2016-172408 filed on Sep. 5, 2016, the entirety of which is incorporated herein by references.

BACKGROUND OF THE INVENTION

Field of the Invention

The present invention relates to an imaging control apparatus and an imaging apparatus for synchronous shooting.

Description of the Related Art

Technologies are known in which a plurality of imaging apparatuses carry out radio communication operations by synchronous communication modes, the shooting clocks of the imaging apparatuses are synchronized with one another using communication clocks synchronized with one another by the communication operations, and the imaging apparatuses execute synchronous shooting at the timing of the synchronized shooting clocks (refer to, for example, Japanese Patent Application Laid-Open Publication Nos. 2014-11529 and 2014-11633).

SUMMARY OF THE INVENTION

To achieve the above object, an imaging control apparatus according to one aspect of the present invention includes: a processor; and a radio communication unit capable of selecting a first transmission mode and a second transmission mode, the first transmission mode involving wireless data transmission to each of a plurality of imaging apparatuses with reception of a receipt acknowledgement from the imaging apparatuses, the second transmission mode involving simultaneous wireless data transmission to the imaging apparatuses without reception of the receipt acknowledgement from the imaging apparatuses. The processor performs a communication controlling step involving, in the case of instructing at least one simultaneous shooting process to the imaging apparatuses, separately transmitting each piece of shooting preparation instruction data instructing shooting preparation to each of the imaging apparatuses in the first transmission mode, and then simultaneously transmitting shooting instruction data to the imaging apparatuses in the second transmission mode.

An imaging apparatus according to another aspect of the present invention includes: a processor; and a radio communication unit including a first communication mode and a second communication mode, the first communication mode involving wireless communication with transmission of a receipt acknowledgement to an image controlling apparatus in response to first data transmission from the image controlling apparatus, the second communication mode involving wireless communication without transmission of the receipt acknowledgement to the image controlling apparatus in response to second data transmission from the image controlling apparatus. The processor performs a shooting controlling step involving: starting shooting preparation upon reception of shooting preparation instruction data instructing the shooting preparation firstly transmitted in the first communication mode; transmitting an acknowledgement of completion after the shooting preparation is completed; and performing a shooting operation upon reception of shooting instruction data secondly transmitted in the second communication mode.

BRIEF DESCRIPTION OF THE SEVERAL VIEWS OF THE DRAWINGS

The above and further objects, features and advantages of the present invention will be made clearer by the following detailed description and the attached drawings, in which.

DETAILED DESCRIPTION OF THE PREFERRED EMBODIMENTS

The embodiments of the present invention will now be described in detail with reference to the accompanying drawings, which should not be construed to limit the present invention.

Figure 1:
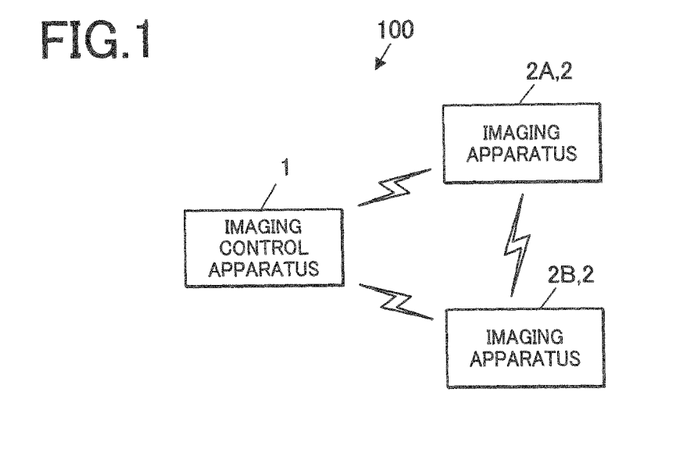
FIG. 1 is a schematic diagram of a configuration of a multiple-connection camera system according to an embodiment of the present invention.

FIG. 1 is a schematic diagram of a configuration of a multiple-connection camera system 100 according to an embodiment of the present invention.

As shown in FIG. 1, the multiple-connection camera system 100 according to this embodiment includes: an imaging control apparatus 1 carrying out radio communication with synchronous communication scheme (for example, Bluetooth (registered trade mark)); and a plurality of imaging apparatuses 2 (two imaging apparatuses 2A and 2B in FIG. 1).

Before performing radio communication with synchronous communication scheme in the multiple-connection camera system 100 according to the embodiment, one imaging control apparatus 1 is selected as a master in Piconet (one of the communication schemes for simultaneous communication between devices/apparatuses in the Bluetooth communication standard). A plurality of imaging apparatus 2 is then selected for multiple connections as slaves in the Piconet (including the selected imaging control apparatus 1 as the master). After communication connection through the Piconet is established between the master or imaging control apparatus 1 and each of the slaves or imaging apparatuses 2, signals can be transmitted between the imaging control apparatus 1 and the imaging apparatuses 2.

The imaging control apparatus 1 will now be described with reference to FIG. 2.

Figure 2:
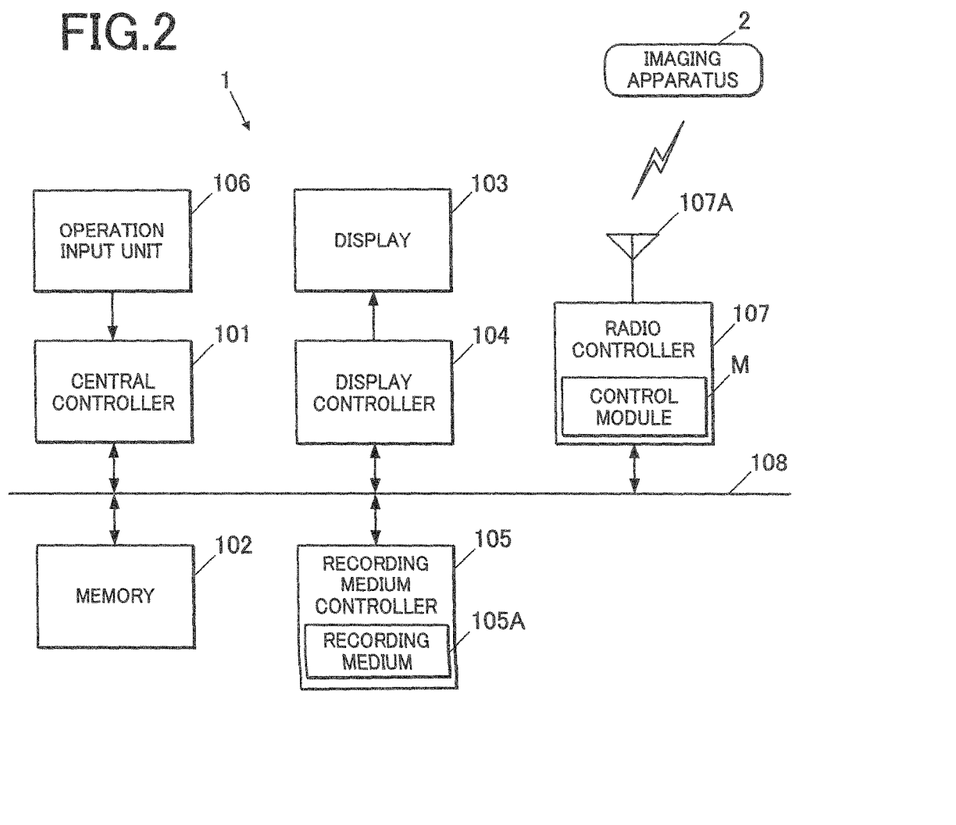
FIG. 2 is a schematic block diagram of a configuration of an imaging control apparatus provided in the multiple-connection camera system in FIG. 1.

FIG. 2 is a schematic block diagram of the configuration of the imaging control apparatus 1.

The imaging control apparatus 1 works as the master in the radio communication utilizing synchronous communication scheme with a device/apparatus to be controlled by the imaging control apparatus 1 (for example, imaging apparatus 2). In detail, as shown in FIG. 2, the imaging control apparatus 1 includes central controller 101, a memory 102, a display 103, a display controller 104, a recording medium controller 105, an operation input unit 106, and a radio controller 107.

The central controller 101, the memory 102, the display controller 104, the recording medium controller 105, and the radio controller 107 are mutually connected via a bassline 108.

It is noted that the imaging control apparatus 1 may be a dedicated device compatible with the imaging apparatus 2, or may be a mobile phone, smartphone, or personal data assistant (PDA).

The central controller 101 controls individual units of the imaging control apparatus 1. In detail, the central controller 101 includes a micro controller unit (MCU) (not shown) and a digital signal processor (DSP) (not shown) which carry out a variety of control operations under instructions of application programs (not shown) for the imaging control apparatus 1.

The memory 102 is composed of, for example, a dynamic random access memory (DRAM), and temporarily records data to be processed by the central controller 101 and/or other units of the imaging control apparatus 1.

The display 103 includes, for example, an LCD, and displays a variety of pieces of information on a display region thereof under the control of the central controller 101. In detail, the display 103 displays an application screen, such as live view image display screen and remote operation screen, on the display region in response to the image signal, for example, from the display controller 104.

The display controller 104 creates the application screen based on the implementation of a variety of application programs, such as a live view image display program and a remote operation program (not shown) by the central controller 101, and outputs image signals according to the created application screen to the display 103.

The recording medium controller 105 is configured such that a recording medium 105A is attachable/detachable to/from the recording medium controller 105, and controls data reading from the attached recording medium 105A and data writing onto the recording medium 105A.

In detail, the recording medium controller 105 allows the recording medium 105A to record the image data, such as still images and moving images, taken at and transmitted from the imaging apparatus 2 by radio communication, in a predetermined storage area.

It should be noted that the recording medium 105A is composed of, for example, a nonvolatile memory or flash memory.

The operation input unit 106 receives a variety of instructions to the imaging control apparatus 1.

In detail, the operation input unit 106 includes, for example, a power button for switching on/off the imaging control apparatus 1, vertical and horizontal cursor buttons and a determination button for selection and instruction on the mode and functions (not shown).

In response to the operation of these buttons by a user, the operation input unit 106 outputs an operational instruction corresponding to the operated button to the central controller 101. The central controller 101 allows individual units to perform a predetermined operation (for example, synchronous communication operation) in response to the operational instruction from the operation input unit 106.

The operation input unit 106 may be provided with a touch panel integrated with the display 103 to output an operational instruction to the central controller 101 in response to a predetermined operation of the tough panel by the user.

The radio controller 107 controls communications to/from a device/apparatus to be controlled (for example, imaging apparatus 2) connected via a predetermined radio communication line.

In detail, the radio controller 107 sends and receives data by the radio communication utilizing synchronous communication scheme (for example, Bluetooth). For example, the radio controller 107 includes a control module M for the radio communication utilizing synchronous communication scheme based on the Bluetooth communication standard to/from the device/apparatus to be controlled via a communication antenna 107A.

The configuration of the control module M provided in the radio controller 107 will be described later (refer to FIG. 4).

The imaging apparatus 2 will now be described with reference to FIG. 3.

Figure 3:
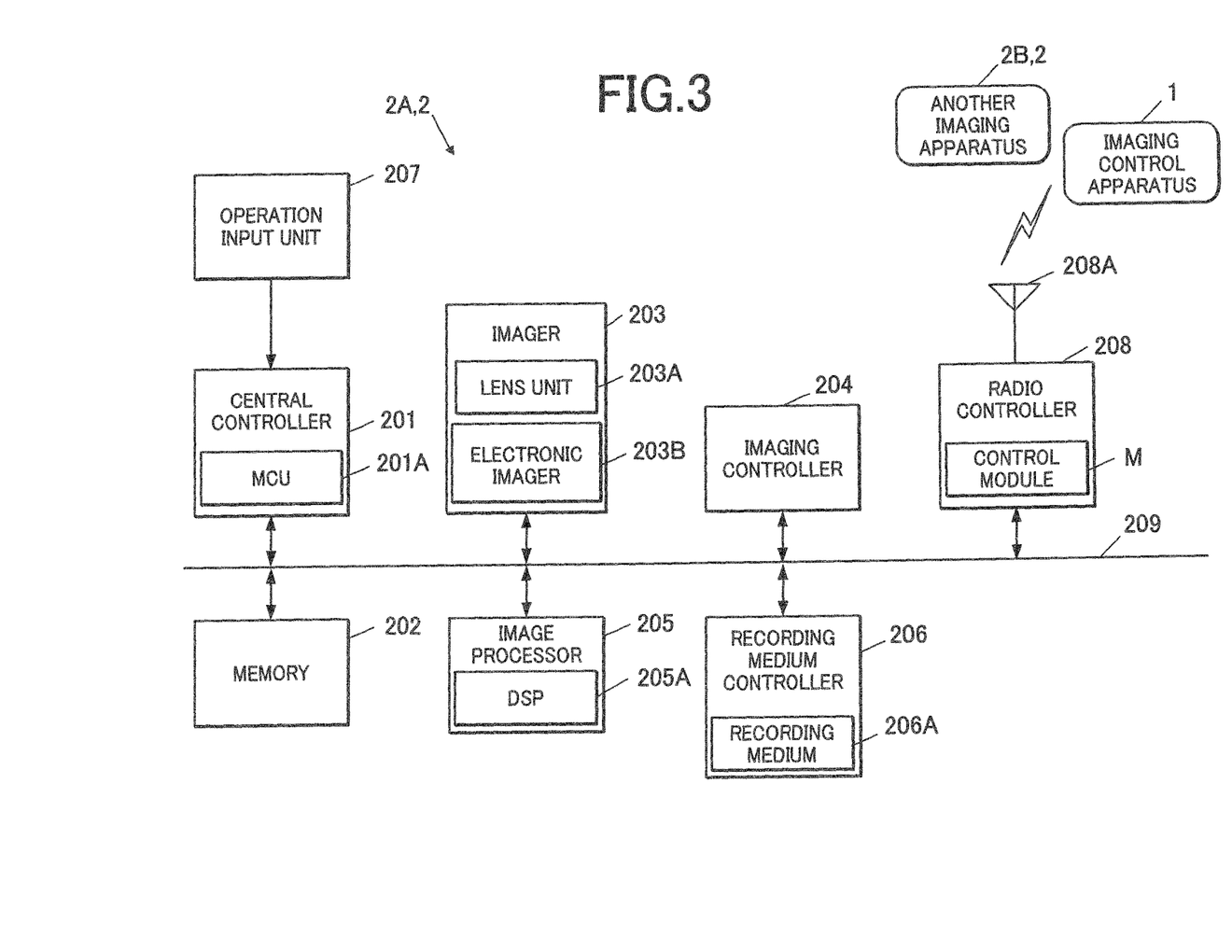
FIG. 3 is a schematic block diagram of a configuration of an imaging apparatus provided in the multiple-connection camera system in FIG. 1.

FIG. 3 is a schematic block diagram illustrating a configuration of the imaging apparatus 2.

The multiple imaging apparatuses 2 function as slaves in the radio communication utilizing synchronous communication scheme with a controlling device/apparatus (the imaging control apparatus 1). Since these imaging apparatuses have substantially the same configuration and operation, the imaging apparatus 2A is exemplified. All the imaging apparatuses 2 are not necessarily of the same type.

With reference to FIG. 3, the imaging apparatus 2A includes a central controller 201, a memory 202, an imager 203, an imaging controller 204, an image processor 205, a recording medium controller 206, an operation input unit 207, and a radio controller 208.

The central controller 201, the memory 202, the imager 203, the imaging controller 204, the image processor 205, the recording medium controller 206 and the radio controller 208 are mutually connected via a bassline 209.

The central controller 201 controls of the individual units of the imaging apparatus 2A. In detail, the central controller 201 includes a micro controller unit (MCU) 201A that carries out a variety of control operations under instructions of processing programs (not shown) for the imaging apparatus 2A.

Figure 6:
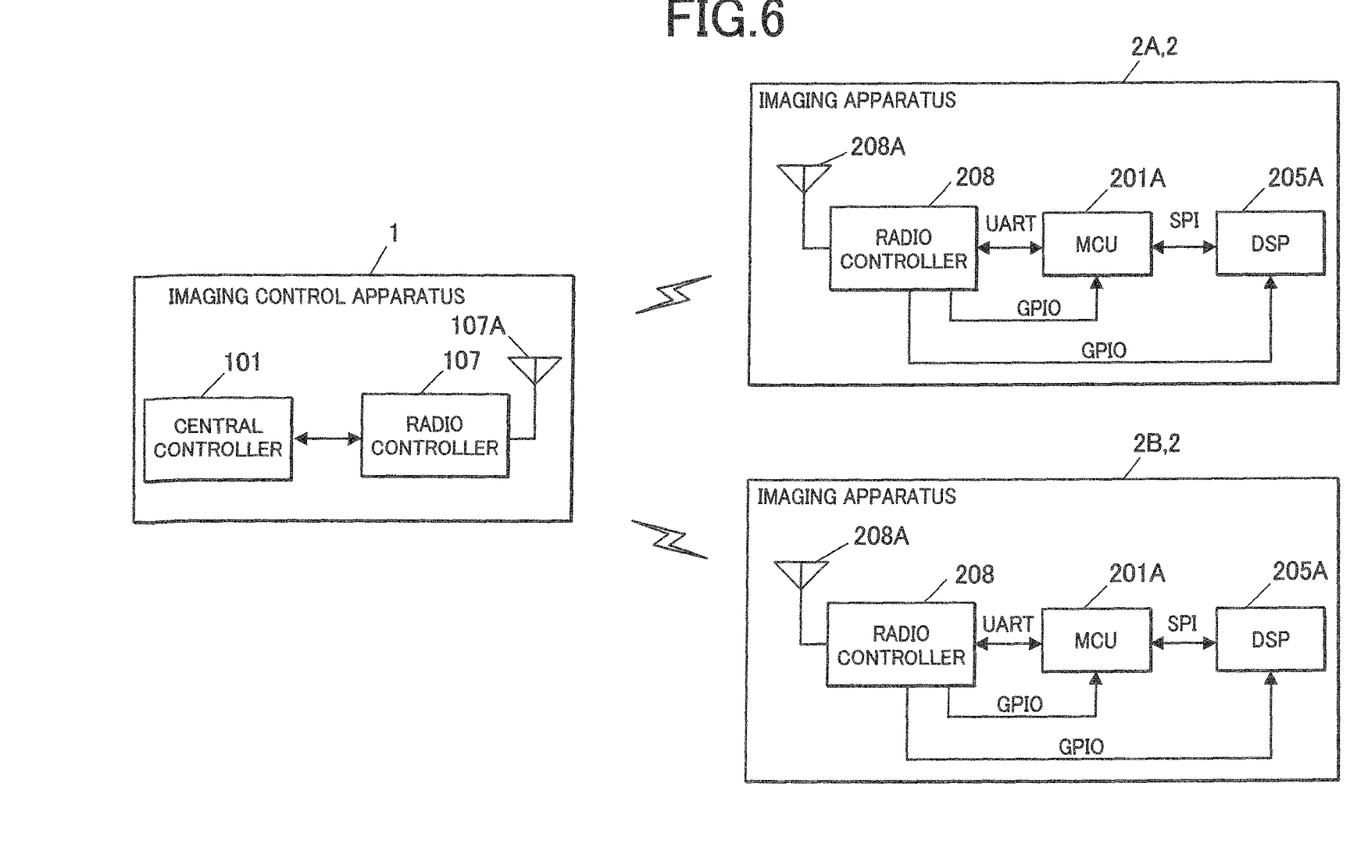
FIG. 6 is a schematic diagram illustrating signal processing in the imaging apparatus during the simultaneous shooting process in FIG. 5.

With reference to FIG. 6, the MCU 201A is connected to a radio controller 208 to be described later via a general-purpose input/output (GPIO). The MCU 201A can detect a variation in the GPIO level in the radio controller 208.

The memory 202 is composed of, for example, dynamic random access memory (DRAM) and temporarily stores data processed by the central controller 201 and other units of the imaging apparatus 2A.

The imager 203 constitutes an imaging unit which captures one or more images of the subject. In detail, the imager 203 includes a lens unit 203A and an electronic imager 203B.

The lens unit 203A is composed a plurality of lens, such as a zoom lens and a focusing lens.

The electronic imager 203B is composed of an image sensor, for example, a charge coupled device (CCD) or complementary metal-oxide semiconductor (CMOS), and converts an optical image passing through the various lenses in the lens unit 203A into a two-dimensional image signal.

The imager 203 may include a diaphragm (not shown) that controls the quantity of the light passing through the lens unit 203A.

The imaging controller (imaging controlling unit) 204 controls the capturing of the images of the subject by the imager 203. In detail, the imaging controller 204 includes a timing generator and a driver (that are not shown). The imaging controller 204 performs scan driving of the electronic imager 203B with the timing generator and the driver, converts the focused optical images from the lens unit 203A into two-dimensional image signals at every predetermined interval in the electronic imager 203B, and reads frame images for every screen from the imaging region of the electronic imager 203B to output the frame images to the image processor 205. The imaging controller 204 controls the conditions for capturing the images of the subject, such as automatic focusing (AF), automatic exposure (AE), and automatic white balancing (AWB).

In this embodiment, upon reception of a shooting request instructing shooting preparation (shooting preparation instruction data) from the radio controller 208 through individual data transmission in a first communication mode (described later), the imaging controller 204 starts measurements and setting operations of the AF, AE, AWB, etc. After completion of measurements and setting operations of the AF, AE, AWB, etc., the imaging controller 204 allows the imager 203 to capture the image of the subject upon reception of a request for simultaneous shooting start (shooting instruction data) through simultaneous data transmission in a second communication mode (described later).

The image processor 205 includes a digital signal processor (DSP) 205A and controls the imager 203 to perform a capturing process that involves capturing of the image of the subject, development of the image, and formation of the image data. The image processor 205 Also processes the image data in various In detail, the image processor 205 appropriately adjusts the gain of each color component (R, G, or B) of the analog signal of the frame image transmitted from the electronic imager 203B, holds the gain at a sample hold circuit (not shown), converts the accumulated data into the digital data at an A/D converter (not shown), performs color processing treatment involving pixel interpolation and gamma-correction in a color processing circuit (not shown), and generates digital brightness signal Y and color difference signals Cb and Cr (YUV data).

With reference to FIG. 6, the DSP 205A is connected to the radio controller 208 (described later) via the GPIO. The DSP 205A can detect a variation in the GPIO level in the radio controller 208.

In order to display live view images at the imaging control apparatus 1, the image processor 205 generates image data for display of individual frame images of the live view image and outputs the image data to the radio controller 208. The radio controller 208 transmits the input image data to the imaging control apparatus 1 via a communication antenna 208A.

In order to record the image, the image processor 205 compresses the YUV data of the subject in accordance with a predetermined encoding scheme (for example, JPEG format, motion JPEG format, and MPEG format) and the output the compressed data to the recording medium controller 206.

The recording medium controller 206 is configured such that a recording medium 206A is attachable/detachable to/from the recording medium controller 206, and controls data reading from the mounted recording medium 206A and data writing onto the recording medium 206A.

In detail, the recording medium controller 206 allows the image processor 205 to record the image data encoded by a predetermined compression format (for example, JPEG format, motion JPEG format, and MPEG format) into a predetermined storage region of the recording medium 206A.

It should be noted that the recording medium 206A is composed, for example, a nonvolatile memory or flash memory.

The operation input unit 207 receives predetermined inputs for operating the imaging apparatus 2A.

In detail, the operation input unit 207 includes, for example, a power button for switching on/off the power of the imaging apparatus 2A, a shutter button for instructing the image capture of the subject, a selection button for selecting the capturing mode and/or function (that are not shown).

In response to the operation of these buttons by a user, the operation input unit 207 outputs the operational instruction corresponding to the operated button to the central controller 201. The central controller 201 allows the individual units to perform a predetermined operation in response to the operational instruction from the operation input unit 207.

The radio controller 208 controls the communication with other devices/apparatuses (for example, the imaging control apparatus 1 and the other imaging apparatuses 2) provided in the multiple-connection camera system 100 via a predetermined radio communication line.

In detail, the radio controller 208 has substantially the same configuration as the radio controller 107 of the imaging control apparatus 1 and sends and receives data by the radio communication utilizing synchronous communication scheme (for example, Bluetooth). For example, the radio controller 208 includes a control module M for the radio communication utilizing synchronous communication scheme with the imaging control apparatus 1 and the other imaging apparatus(es) 2 via the communication antenna 208A in accordance with the Bluetooth communication standard. The configuration of the control module M provided in the radio controller 208 will be described later (refer to FIG. 4).

When receiving the request for simultaneous shooting start at the synchronous communication unit M1 of the control module M (described later), the radio controller 208 varies the level of the GPIO signals (general-purpose I/O terminals) in the radio controller 208 as shown in FIG. 6, the MCU 201A and DSP 205A connected to the radio controller 208 via GPIO signals can detect a variation in GPIO signals and thus can detect the reception of the request for simultaneous shooting start at the radio controller 208. When the synchronous communication unit M1 of the radio controller 208 receives the request for simultaneous shooting start, the radio controller 208 can start the shooting operation at the DSP 205A by the GPIO signals (by hardware processing) without software processing such as data analysis of the request for simultaneous shooting start at the radio controller 208 and issue of an event to the MCU 201A through UART signals (asynchronous signals). By omission of such a software processing, the imaging apparatus 2A and 2B of this embodiment can rapidly detect the request for simultaneous shooting start to start the image capturing process and reduce the error at the timing between the starts of the simultaneous shooting operations at the imaging apparatuses 2A and 2B.

Figure 4:
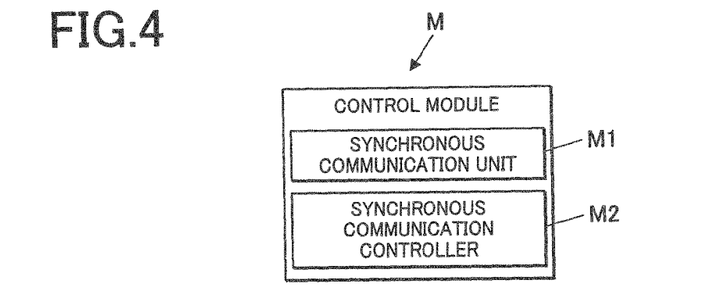
FIG. 4 is a schematic block diagram of a configuration of a control module of a radio controller.

With reference to FIG. 4, the control module M provided in the radio controller 107 of the imaging control apparatus 1 and the control module M provided in the radio controller 208 of the imaging apparatus 2 will now be described.

FIG. 4 is a schematic block diagram of configuration of the control module M.

Although the control module M provided in the radio controller 107 of the imaging control apparatus 1 has substantially the same configuration as that of radio controller 208 of the imaging apparatus 2, the control module M provided in the imaging control apparatus 1 as a master has different operation in the radio communication with synchronous communication scheme from the control module M provided in the imaging apparatus 2 as a slave.

As shown in FIG. 4, the control module M includes a synchronous communication unit M1 and a synchronous communication controller M2.

The synchronous communication unit M1 performs the radio communication utilizing synchronous communication scheme with any external device/apparatus.

In detail, the synchronous communication unit M1 performs the radio communication with synchronous communication scheme that sends and receives data in synchronous communication between the communication clock of a communication unit and the communication clock of the counter unit. The radio communication with synchronous communication scheme enables three or more devices/apparatuses to be in synchronous communication with one another. For example, the radio communication utilizing synchronous communication scheme based on the Bluetooth communication standard forms the Piconet allowing eight devices/apparatuses at maximum to participate.

The synchronous communication unit M1 of the control module M provided in the imaging control apparatus 1 being the master in the radio communication with synchronous communication scheme can perform a first communication mode (for example, polling mode) involving data transmission to individual imaging apparatuses 2 with a receipt acknowledgement from the imaging apparatuses 2 and a second communication mode (for example, broadcast mode) involving simultaneous data transmission to multiple imaging apparatuses 2 without a receipt acknowledgement from the imaging apparatuses 2.

When a signal instructing synchronously capturing a still image (a simultaneous shooting instruction signal) by the imaging apparatuses 2A and 2B is outputted to the radio controller 107 in response to a predetermined operation of the operation input unit 106 of the image controlling apparatus 1 by a user, the synchronous communication unit M1 of the control module M provided in the imaging control apparatus 1 being the master in the radio communication with synchronous communication scheme separately transmits the shooting request instructing the shooting preparation (shooting preparation instruction data) to the imaging apparatuses 2A and 2B in the first communication mode under control of the synchronous communication controller M2. The synchronous communication unit M1 of the control module M provided in the imaging control apparatus 1 being the master in the radio communication with synchronous communication scheme receives the acknowledgements of completion of the shooting preparation from all the imaging apparatuses 2A and 2B receiving the shooting request under control of the synchronous communication controller M2, and then simultaneously transmits the requests for simultaneous shooting start (shooting instruction data) in the second communication mode to the imaging apparatuses 2A and 2B.

Figure 7:
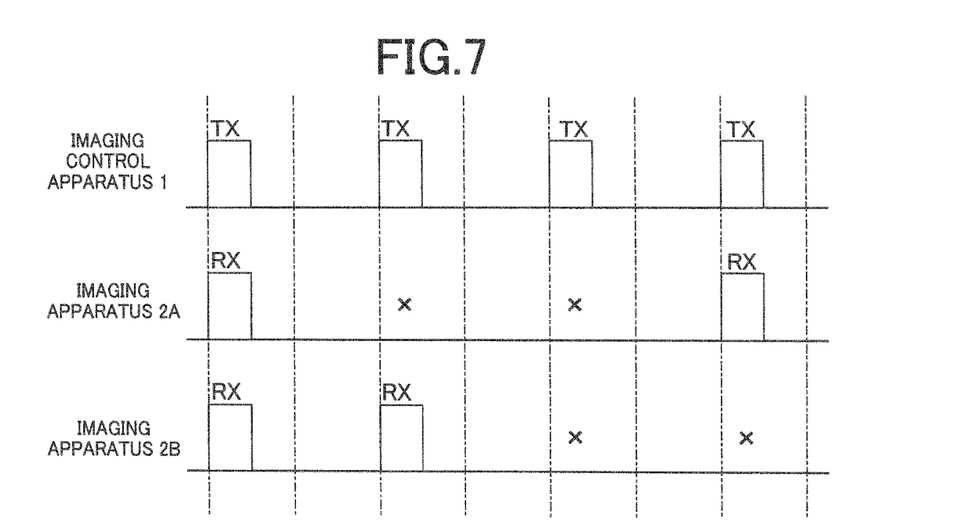
FIG. 7 is a diagram illustrating a communication mode on a request for simultaneous shooting start.
Figure 8:
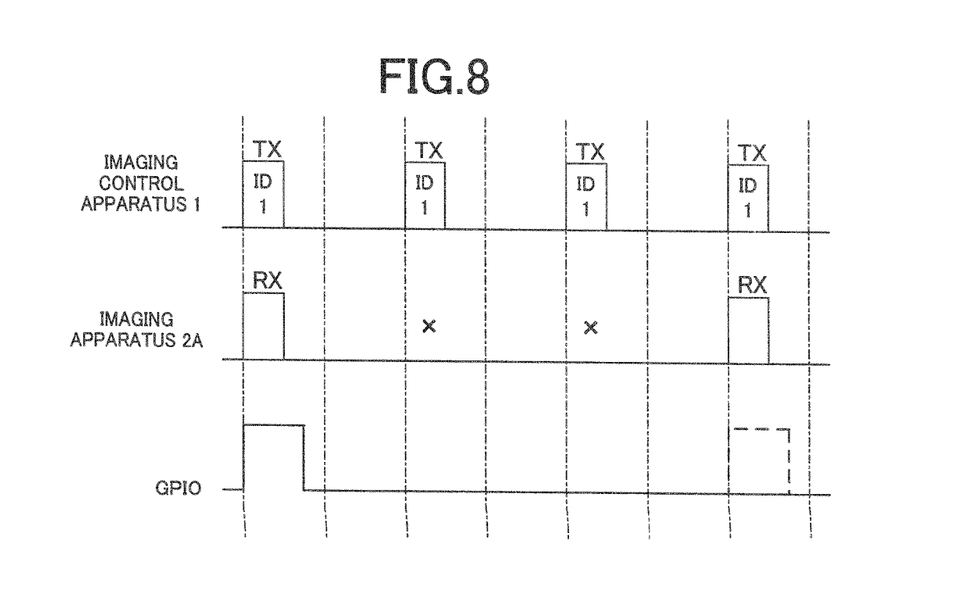
FIG. 8 is a diagram illustrating a variation in the GPIO level when the imaging apparatus receives the same requests for simultaneous shooting start several times.

The synchronous communication unit M1 of the control module M provided in the imaging control apparatus 1 being the master in the radio communication with synchronous communication scheme simultaneously transmits the same requests for simultaneous shooting start TX several times (for example, four times) as shown in FIG. 7. This is because each imaging apparatus 2A or 2B being the slave does not always receive the request for simultaneous shooting start TX at one time and thus cannot transmit the receipt acknowledgement. FIG. 7 illustrates the case of the imaging apparatus 2A that received the first and fourth requests for simultaneous shooting start TX simultaneously transmitted from the imaging control apparatus 1, but failed to receive the simultaneously-transmitted second and third requests for simultaneous shooting start TX. FIG. 7 also illustrates the case of the imaging apparatus 2B that received the first and second requests for simultaneous shooting start TX simultaneously transmitted from the imaging control apparatus 1, but failed to receive the simultaneously-transmitted third and fourth requests for simultaneous shooting start TX. In the case that each imaging apparatus 2A or 2B receives the same requests for simultaneous shooting start TX several times, however, a problem arises in that the level of the GPIO signal in the radio controller 208 inevitably varies every time the radio controller 208 receives the request for simultaneous shooting start TX, as shown in FIG. 7. To address the issue, as shown in FIG. 8, the synchronous communication unit M1 of the control module M provided in the imaging control apparatus 1 transmits the same requests for simultaneous shooting start TX tagged with the same ID information, for example, "1". The radio controller 208 checks for the ID information tagged with the request for simultaneous shooting start every time the synchronous communication unit M1 receives the request for simultaneous shooting start, and determines whether the received request for simultaneous shooting start is the same as the request that has been received, based on the ID information. In the case that the same request for simultaneous shooting start is received, the radio controller 208 does not vary the level of the GPIO signal in the radio controller 208.

The synchronous communication unit M1 of the control module M provided in the imaging control apparatus 1 being the master in the radio communication with synchronous communication scheme adds different ID information to a request for simultaneous shooting start every time the simultaneous shooting instruction signal is output to the radio controller 107, and broadcasts the request for simultaneous shooting start.

The synchronous communication units M1 of the control modules M provided in the imaging apparatuses 2 being the slaves in the radio communication with synchronous communication scheme performs the radio communication with synchronous communication scheme with the imaging control apparatus 1 that controls the synchronized image capturing by the imaging apparatuses 2.

For example, the synchronous communication unit M1 of the control module M provided in each of the imaging apparatuses 2 can perform a first communication mode involving separate radio communication with transmission of a receipt acknowledgement to the imaging control apparatus 1 and a second communication mode involving simultaneous data transmission without transmission of a receipt acknowledgement to the imaging control apparatus 1.

When the radio controller 208 of the imaging apparatus 2 receives the shooting request transmitted in a first communication mode from the imaging control apparatus 1, the synchronous communication unit M1 of the radio controller 208 transmits an acknowledgement of completion of shooting preparation to the imaging control apparatus 1 in response to the completion of measurements and setting operations of AF, AE, AWB, etc. at the imaging controller 204.

When the radio controller 208 of the imaging apparatus 2 receives the request for simultaneous shooting start transmitted in a second communication mode from the imaging control apparatus 1, the synchronous communication unit M1 of the radio controller 208 transmits an acknowledgement of completion of the simultaneous shooting to the imaging control apparatus 1 in response to the completion of the operation of capturing the subject image at the imager 203.

The synchronous communication controller (communication controlling unit) M2 establishes the synchronous radio communication between the synchronous communication unit M1 and the external devices/apparatuses.

In detail, the synchronous communication controller M2 of the control module M provided in the imaging control apparatus 1 being the master in the radio communication with synchronous communication scheme establishes the synchronous radio communication between the synchronous communication unit M1 and the imaging apparatuses 2.

The synchronous communication controllers M2 of the control modules M provided in the imaging apparatuses 2 being the slaves in the radio communication with synchronous communication scheme establish the synchronous radio communication between the synchronous communication unit M1 and the other imaging apparatuses 2 (for example, the imaging apparatus 2B) to participate in the synchronous shooting.

Figure 5:
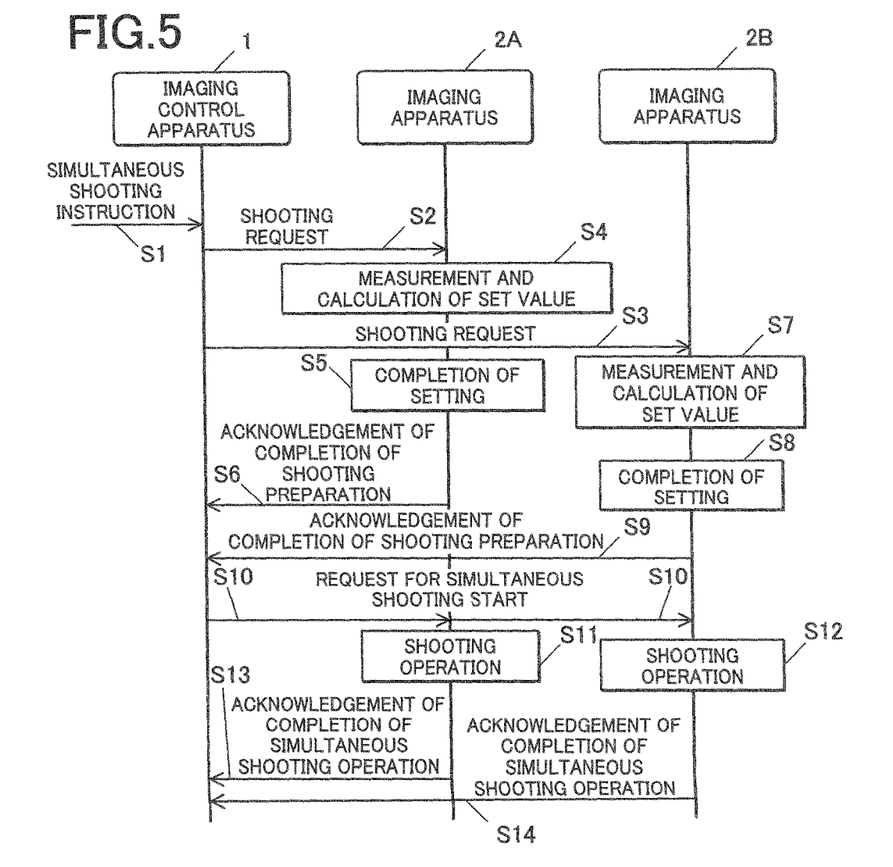
FIG. 5 is a sequence diagram of an example operation on a simultaneous shooting process performed by the multiple-connection cameral system in FIG. 1.

The simultaneous shooting process performed by the multiple-connection camera system 100 according to this embodiment will now be described. FIG. 5 is a sequence diagram of an example operation on the simultaneous shooting process.

In the following simultaneous shooting process, the imaging control apparatus 1 and the imaging apparatuses 2A and 2B are linked via a predetermined radio communication line (for example, Bluetooth) and can transmit various requirements in both directions.

With reference to FIG. 5, when the signal instructing the synchronous shooting of a still image by the imaging apparatuses 2A and 2B (a simultaneous shooting instruction signal) is output to the radio controller 107 in response to a predetermined operation of the operation input unit 106 of the imaging control apparatus 1 by a user (Step S1), the synchronous communication unit M1 of the control module M provided in the imaging control apparatus 1 separately transmits the shooting request to each of the imaging apparatuses 2A and 2B under control of the synchronous communication controller M2 (Steps S2 and S3). The imaging controller 204 of the imaging apparatus 2A receiving the shooting request performs measurements and setting operations of the AF, AE, AWB, etc. as shooting preparation (Step S4). After completion of measurements and setting operations of the AF, AE, AWB, etc. by the imaging controller 204 of the imaging apparatus 2A (Step S5), the synchronous communication unit M1 of the control module M provided in the imaging apparatus 2A transmits the acknowledgement of completion of shooting preparation to the imaging control apparatus 1 under the control by the synchronous communication controller M2 (Step S6).

The imaging controller 204 of the imaging apparatus 2B receiving the shooting request also performs measurements and setting operations of the AF, AE, AWB, etc. as shooting preparation, like the imaging apparatus 2A (Step S7). After completion of measurements and setting operations of the AF, AE, AWB, etc. by the imaging controller 204 of the imaging apparatus 2B (Step S8), the synchronous communication unit M1 of the control module M provided in the imaging apparatus 2B transmits the acknowledgement of completion of the shooting preparation to the imaging control apparatus 1 under the control by the synchronous communication controller M2 (Step S9).

The synchronous communication unit M1 of the control module M provided in the imaging control apparatus 1 receives the acknowledgement of completion of shooting preparation from all the imaging apparatuses 2A and 2B receiving the shooting request, and then simultaneously transmits the requests for simultaneous shooting start (shooting instruction data) in the second communication mode to the imaging apparatuses 2A and 2B (Step S10). The imaging controllers 204 of the imaging apparatuses 2A and 2B receiving the request for simultaneous shooting start allow the imagers 203 to start the shooting operation of the image of the subject (Steps S11 and S12). After completion of the shooting operation of the image of the subject by the imager 203 of the imaging apparatus 2A, the synchronous communication unit M1 of the control module M provided in the imaging apparatus 2A transmits the acknowledgement of completion of the simultaneous shooting to the imaging control apparatus 1 under the control by the synchronous communication controller M2 (Step S13). Like the imaging apparatus 2A, after completion of the shooting operation by the imager 203 of the imaging apparatus 2B, the synchronous communication unit M1 of the control module M provided in the imaging apparatus 2B transmits the acknowledgement of completion of the simultaneous shooting to the imaging control apparatus 1 under the control by the synchronous communication controller M2 (Step S14) to complete the simultaneous shooting process.

The imaging control apparatus 1 provided in the multiple-connection camera system 100 of this embodiment can select a first transmission mode involving wireless data transmission to individual imaging apparatuses 2 with a receipt acknowledgement from the apparatuses 2 or a second transmission mode involving simultaneous wireless data transmission to multiple imaging apparatuses without a receipt acknowledgement from the imaging apparatuses. In the case of instructing the simultaneous shooting to the imaging apparatuses 2, the imaging control apparatus 1 separately transmits the shooting preparation instruction data (shooting request) instructing shooting preparation to the imaging apparatuses 2 in the first transmission mode, and then simultaneously transmits shooting instruction data (request for simultaneous shooting start) to these imaging apparatuses in the second transmission mode.

As described above, the imaging control apparatus 1 provided in the multiple-connection camera system 100 of this embodiment allows the imaging apparatuses 2 to prepare the shooting operation and broadcasts the shooting instruction data (request for simultaneous shooting start) to the imaging apparatuses 2. This configuration can prevent the trouble that the imaging apparatuses 2 have yet to finish the shooting preparation when the shooting instruction data is broadcast. The multiple-connection camera system 100 of this embodiment thus can achieve high-precision synchronous shooting by effective use of the radio communication with synchronous communication scheme.

The imaging control apparatus 1 provided in the multiple-connection camera system 100 of this embodiment simultaneously transmits the shooting instruction data (requests for simultaneous shooting start) to the imaging apparatuses 2 several times for one simultaneous shooting in the second transmission mode. This configuration can prevent the trouble that the imaging apparatuses 2 have never receive the shooting instruction data.

The imaging control apparatus 1 provided in the multiple-connection camera system 100 of this embodiment makes different ID information, for each simultaneous shooting process, tagged with the shooting instruction data (requests for simultaneous shooting start) to be broadcast in the second transmission mode, and broadcasts the same shooting instruction data tagged with the same ID information for one simultaneous shooting process.

Even if each of the imaging apparatuses 2 receives the same shooting instruction data two or more times for one simultaneous shooting process, the imaging apparatuses 2 can identify the shooting instruction data tagged with the same ID information as duplicated shooting instruction data. This configuration prevents start of the shooting operation every time the same shooting instruction data is received at the imaging apparatuses 2 two or more times.

The imaging control apparatus 1 provided in the multiple-connection camera system 100 of this embodiment separately transmits the shooting preparation instruction data (shooting request) instructing the shooting preparation to the imaging apparatuses 2 in the first transmission mode, waits until receiving the acknowledgement of completion of shooting preparation from all the imaging apparatuses 2 receiving the shooting preparation instruction data, and then simultaneously transmits the shooting instruction data (requests for simultaneous shooting start) in the second transmission mode. This configuration can prevent the trouble that the imaging apparatuses 2 have yet to finish the shooting preparation when the shooting instruction data is simultaneously transmitted.

The imaging apparatus 2 provided in the multiple-connection camera system 100 of this embodiment can select a first communication mode involving separate radio communication to the imaging control apparatus 1 with transmission of a receipt acknowledgement to the apparatus 1 and a second communication mode involving simultaneous data transmission to the imaging control apparatus 1 without transmission of a receipt acknowledgement to the apparatuses 1. The imaging apparatus 2 starts the shooting preparation upon reception of the shooting preparation instruction data (shooting request) instructing the shooting preparation separately transmitted in the first communication mode, transmits an acknowledgement of completion after the shooting preparation is completed, and then starts the shooting operation upon reception of the shooting instruction data (request for simultaneous shooting start) simultaneously transmitted in the second communication mode. This configuration can prevent the trouble that the shooting operation has not finished when the shooting instruction data is received. The multiple-connection camera system 100 of this embodiment thus can achieve high-precision synchronous shooting by effective use of the radio communication with synchronous communication scheme.

Upon reception of the shooting instruction data (request for simultaneous shooting start) simultaneously transmitted in the second communication mode, the imaging apparatus 2 provided in the multiple-connection camera system 100 of this embodiment starts the shooting operation if the ID information tagged with this shooting instruction data differs from the ID information tagged with the shooting instruction data that has been received a predetermined time before, but skips the shooting operation if these pieces of ID information are the same. This configuration prevents start of the shooting operation every time the same shooting instruction data is received two or more times for one simultaneous shooting process.

Upon reception of the shooting instruction data (request for simultaneous shooting start) simultaneously transmitted in the second communication mode, the imaging apparatus 2 provided in the multiple-connection camera system 100 of this embodiment directly controls the shooting operation by a shooting control circuit without interruption by software. This configuration can reduce the delay of the process due to the interruption and thus can reduce the error at the timing between the starts of the simultaneous shooting operations at the imaging apparatuses 2.

The embodiments described above should not be construed to limit the present invention, and various modifications and design variations may be employed within the scope of the present invention.

For example, two imaging apparatuses 2A and 2B are exemplified in the embodiments described above. Instead, three or more imaging apparatuses 2 may be incorporated.

In the embodiments described above, simultaneous shooting processes of still images are carried out with synchronized imaging apparatus 2A and 2B. Any other shooting mode is also available. For example, interval shooting operations of still images and dynamic images can also be carried out with synchronized imaging apparatus 2A and 2B. In detail, in response to a predetermined operation of the operation input unit 106 of the imaging control apparatus 1 by a user, a signal instructing an interval shooting (interval shooting instruction signal), for example, an interval shooting of still images, under synchronization of the imaging apparatuses 2A and 2B is output to the radio controller 107. The synchronous communication unit M1 of the control module M provided in the imaging control apparatus 1 then separately transmits an interval shooting setting request to each of the imaging apparatuses 2A and 2B under the control by the synchronous communication controller M2. The imaging controller 204 of the imaging apparatus 2A receiving the interval shooting setting request carries out setting operations of the interval width and shooting mode as preparation of the interval shooting. After the completion of the setting operations of the interval width and shooting mode at the imaging controller 204 of the imaging apparatus 2A, the synchronous communication unit M1 of the control module M provided in the imaging apparatus 2A transmits the acknowledgement of completion of interval shooting setting to the imaging control apparatus 1 under the control by the synchronous communication controller M2. The imaging controller 204 of the imaging apparatus 2B receiving the interval shooting setting request carries out setting operations of the interval width and shooting mode, like the imaging apparatus 2A. After the completion of the setting operations of the interval width and shooting mode at the imaging controller 204 of the imaging apparatus 2B, the synchronous communication unit M1 of the control module M provided in the imaging apparatus 2B transmits the acknowledgement of completion of interval shooting setting to the imaging control apparatus 1 under the control by the synchronous communication controller M2.

After that, upon reception of the acknowledgement of completion of interval shooting setting from all the imaging apparatuses 2A and 2B receiving the interval shooting setting request, the synchronous communication unit M1 of the control module M provided in the imaging control apparatus 1 simultaneously transmits the requests for interval shooting start to the imaging apparatuses 2A and 2B in the second communication mode. The imaging controllers 204 of the imaging apparatuses 2A and 2B receiving the requests for interval shooting start allow the imagers 203 to start the interval shooting of the images of the subject. The imaging control apparatus 1 undergoes transition into a sleep mode (for example, the sniff mode in the Bluetooth scheme) to complete the interval shooting process.

Besides the interval shooting process, the present invention is applied to a simultaneous playback process that simultaneously playbacks moving images captured by the simultaneous shooting process side by side on the display 103 of the imaging control apparatus 1.

In detail, in response to a predetermined operation of the operation input unit 106 of the imaging control apparatus 1 by a user, a signal instructing simultaneous playback (simultaneous playback instruction signal) under synchronization of the imaging apparatuses 2A and 2B is output to the radio controller 107. The synchronous communication unit M1 of the control module M provided in the imaging control apparatus 1 then separately transmits a moving image playback request (for only preparation) to each of the imaging apparatuses 2A and 2B under the control by the synchronous communication controller M2. The central controller 201 of the imaging apparatus 2A receiving the moving image playback request then interrupts the running operation. After the interruption of the running operation by the central controller 201 of the imaging apparatus 2A, the synchronous communication unit M1 of the control module M provided in the imaging apparatus 2A transmits the acknowledgement of completion of preparation for moving image playback to the imaging control apparatus 1 under control by the synchronous communication controller M2. The central controller 201 of the imaging apparatus 2B receiving the moving image playback request interrupts the running operation, like the imaging apparatus 2A. After the interruption of the running operation by the central controller 201 of the imaging apparatus 2B, the synchronous communication unit M1 of the control module M provided in the imaging apparatus 2B transmits the acknowledgement of completion of preparation for moving image playback to the imaging control apparatus 1 under the control by the synchronous communication controller M2.

Upon reception of the acknowledgement of completion of preparation for moving image playback from all the imaging apparatuses 2A and 2B receiving the moving image playback requests, the synchronous communication unit M1 of the control module M provided in the imaging control apparatus 1 broadcasts requests for simultaneous playback start to the imaging apparatuses 2A and 2B in the second communication mode. The central controllers 201 of the imaging apparatuses 2A and 2B receiving the requests for simultaneous playback allow start of transmission of frame images constituting the captured moving image to the imaging control apparatus 1. The imaging apparatuses 2A and 2B transmit all the frame images to complete the simultaneous playback process.

In the case that the imaging apparatuses 2 each include a display, moving images captured by each imaging apparatus 2 may be simultaneously played on the display of each imaging apparatus 2.

In the embodiments described above, a function as a communication control unit may be implemented with predetermined programs loaded in the central controller 101 of the imaging control apparatus 1.

In detail, programs containing a communication control routine are preliminarily recorded in a program memory (not shown). The communication control routine allows the central controller 101 to separately transmit the shooting preparation instruction data to each of the imaging apparatuses in the first transmission mode, and then simultaneously transmit the shooting instruction data to the imaging apparatuses in the second transmission mode in the case of instructing the simultaneous shooting to imaging apparatuses.

Similarly, a function as a shooting control unit may be implemented with predetermined programs loaded in the central controller 201 of the imaging apparatus 2.

In detail, programs containing a shooting controlling routine are preliminarily recorded in a program memory (not shown). The shooting control routine allows the central controller 201 to start the shooting preparation in response to the shooting preparation instruction data individually transmitted in the first communication mode, transmit the acknowledgement of completion of shooting preparation, and then carry out shooting operation upon the reception of the shooting instruction data simultaneously transmitted in the second communication mode.

Example of the computer-readable media containing stored programs for performing the operations described above include ROMs, hard disks, nonvolatile memories, such as flash memory, and portable recording media, such as CD-ROMs. Carrier waves are applicable as media providing program data through a predetermined communication line.

Although some of the embodiments of the present invention are described, the scope of the present invention should not be limited to the embodiments, and includes the scope described in claims and equivalent thereof.

What is claimed is:

1. An imaging control apparatus comprising:
   a processor; and
   a radio communication unit comprising a radio controller and an antenna, the radio communication unit being operable in a first transmission mode and a second transmission mode, the first transmission mode involving wireless data transmission to each of a plurality of imaging apparatuses with reception of an acknowledgement from the imaging apparatuses, and the second transmission mode involving simultaneous wireless data transmission to the imaging apparatuses without reception of the acknowledgement from the imaging apparatuses,
   wherein the processor performs a communication controlling process comprising, in a case of instructing at least one simultaneous shooting process to the imaging apparatuses, separately transmitting a piece of shooting preparation instruction data instructing shooting preparation to each of the imaging apparatuses in the first transmission mode, receiving acknowledgements of completion of the shooting preparation from all of the imaging apparatuses having received the shooting preparation instruction data, and then simultaneously transmitting shooting instruction data requesting a simultaneous shooting start to the imaging apparatuses in the second transmission mode.

2. The imaging control apparatus of claim 1, wherein the communication controlling process comprises simultaneously transmitting the shooting instruction data to the imaging apparatuses several times for one of the at least one simultaneous shooting process in the second transmission mode.

3. The imaging control apparatus of claim 2, wherein the communication controlling process comprises adding respective different ID information, for each of the at least one simultaneous shooting process, to the shooting instruction data to be simultaneously transmitted in the second transmission mode, and simultaneously transmitting the shooting instruction data including the same different ID information several times for the one of the at least one simultaneous shooting process.

4. An imaging apparatus comprising:
a processor; and
a radio communication unit comprising a radio controller and an antenna, the radio communication unit being operable in a first communication mode and a second communication mode, the first communication mode involving wireless communication including transmission to an image controlling apparatus in response to a first data transmission from the image controlling apparatus, and the second communication mode involving wireless communication not including transmission to the image controlling apparatus in response to a second data transmission from the image controlling apparatus,
wherein the processor performs a shooting controlling process comprising:
starting shooting preparation upon reception of shooting preparation instruction data instructing the shooting preparation firstly transmitted in the first communication mode;
transmitting an acknowledgement of completion of the shooting preparation after the shooting preparation is completed; and
performing a shooting operation upon reception of shooting instruction data secondly transmitted in the second communication mode.

5. The imaging apparatus of claim 4, wherein the shooting controlling process comprises, upon reception of the shooting instruction data secondly transmitted in the second communication mode, performing the shooting operation if ID information included in the shooting instruction data differs from ID information included in shooting instruction data which has been received a predetermined time before, but skipping the shooting operation if both pieces of the ID information are the same.

6. The imaging apparatus of claim 4, wherein the shooting controlling process comprises, upon reception of the shooting instruction data secondly transmitted in the second communication mode, directly controlling the shooting operation by a shooting control circuit without interruption by software.

7. The imaging apparatus of claim 4, wherein the shooting controlling process comprises:
upon reception of the shooting preparation instruction data instructing preparation of interval shooting, performing setting of the interval shooting in accordance with a condition of the interval shooting contained in the shooting preparation instruction data; and
upon reception of the shooting instruction data instructing the interval shooting, repeating the shooting operation at designated intervals in accordance with the set condition of the interval shooting.

8. The imaging apparatus of claim 4, wherein the processor further performs a playback controlling process comprising:
upon reception of simultaneous playback preparation instruction data instructing preparation of simultaneous playback, performing setting of the simultaneous playback in accordance with a condition of the simultaneous playback contained in the simultaneous playback preparation instruction data; and
upon reception of simultaneous playback start instruction data instructing a start of the simultaneous playback, performing the simultaneous playback in accordance with the set condition of the simultaneous playback.

9. An imaging controlling method performed at an imaging control apparatus including a radio communication unit comprising a radio controller and an antenna, the radio communication unit being operable in a first transmission mode and a second transmission mode, the first transmission mode involving wireless data transmission to each of a plurality of imaging apparatuses with reception of an acknowledgement from the imaging apparatuses, the second transmission mode involving simultaneous wireless data transmission to the imaging apparatuses without reception of the acknowledgement from the imaging apparatuses, and the method comprising:
in a case of instructing at least one simultaneous shooting process to the imaging apparatuses, separately transmitting a piece of shooting preparation instruction data instructing shooting preparation to each of the imaging apparatuses in the first transmission mode, receiving acknowledgements of completion of the shooting preparation from all of the imaging apparatuses having received the shooting preparation instruction data, and then simultaneously transmitting shooting instruction data requesting a simultaneous shooting start to the imaging apparatuses in the second transmission mode.

10. An imaging method performed at an imaging apparatus including a radio communication unit comprising a radio controller and an antenna, the radio communication unit being operable in a first communication mode and a second communication mode, the first communication mode involving wireless communication including transmission to an image controlling apparatus in response to a first data transmission from the image controlling apparatus, the second communication mode involving wireless communication not including transmission to the image controlling apparatus in response to a second data transmission from the image controlling apparatus, and the method comprising:
starting shooting preparation upon reception of shooting preparation instruction data instructing the shooting preparation firstly transmitted in the first communication mode;
transmitting an acknowledgement of completion of the shooting preparation after the shooting preparation is completed; and
performing a shooting operation upon reception of shooting instruction data secondly transmitted in the second communication mode.

11. A non-transitory computer readable medium on which a program for controlling a computer of an imaging control apparatus is recorded, the imaging control apparatus including a radio communication unit comprising a radio controller and an antenna, the radio communication unit being operable in a first transmission mode involving wireless data transmission to each of a plurality of imaging apparatuses with reception of an acknowledgement from the imaging apparatuses and a second transmission mode involving simultaneous wireless data transmission to the imaging apparatuses without reception of the acknowledgement from the imaging apparatuses, and the program being executable by the computer to control the computer to perform processes comprising:
in a case of instructing at least one simultaneous shooting process to the imaging apparatuses, separately transmitting a piece of shooting preparation instruction data instructing shooting preparation to each of the imaging apparatuses in the first transmission mode, receiving acknowledgements of completion of the shooting preparation from all of the imaging apparatuses having received the shooting preparation instruction data, and then simultaneously transmitting shooting instruction data requesting a simultaneous shooting start to the imaging apparatuses in the second transmission mode.

12. A non-transitory computer readable medium on which a program for controlling a computer of an imaging apparatus is recorded, the imaging apparatus including a radio communication unit comprising a radio controller and an antenna, the radio communication unit being operable in a first communication mode and a second communication mode, the first communication mode involving wireless communication including transmission to an image controlling apparatus in response to a first data transmission from the image controlling apparatus, the second communication mode involving wireless communication not including transmission to the image controlling apparatus in response to a second data transmission from the image controlling apparatus, and the program being executable by the computer to control the computer to perform processes comprising:

starting shooting preparation upon reception of shooting preparation instruction data instructing the shooting preparation firstly transmitted in the first communication mode;

transmitting an acknowledgement of completion of the shooting preparation after the shooting preparation is completed; and performing a shooting operation upon reception of shooting instruction data secondly transmitted in the second communication mode.

* * * * *